(12) United States Patent
Cai et al.

(10) Patent No.: US 11,401,710 B2
(45) Date of Patent: Aug. 2, 2022

(54) POLYMER PRE-LAID WATERPROOF ROLLING MATERIAL

(71) Applicant: JIANGSU CANLON BUILDING MATERIALS CO., LTD., Suzhou (CN)

(72) Inventors: Jian Cai, Suzhou (CN); Li Yang, Suzhou (CN); Xuefeng Xie, Suzhou (CN)

(73) Assignee: JIANGSU CANLON BUILDING MATERIALS CO., LTD., Suzhou (CN)

( * ) Notice: Subject to any disclaimer, the term of this patent is extended or adjusted under 35 U.S.C. 154(b) by 375 days.

(21) Appl. No.: 16/827,683

(22) Filed: Mar. 23, 2020

(65) Prior Publication Data

US 2021/0164220 A1    Jun. 3, 2021

(30) Foreign Application Priority Data

Dec. 3, 2019   (CN) .......................... 201911217987.1

(51) Int. Cl.
| | | |
|---|---|---|
| *C09J 7/40* | (2018.01) | |
| *E04B 1/66* | (2006.01) | |
| *C09J 7/38* | (2018.01) | |
| *C09J 11/08* | (2006.01) | |
| *C09J 123/22* | (2006.01) | |
| *C09J 129/02* | (2006.01) | |
| *C09J 153/02* | (2006.01) | |
| *C08K 5/00* | (2006.01) | |

(52) U.S. Cl.
CPC ................. *E04B 1/665* (2013.01); *C09J 7/38* (2018.01); *C09J 7/40* (2018.01); *C09J 11/08* (2013.01); *C09J 123/22* (2013.01); *C09J 129/02* (2013.01); *C09J 153/02* (2013.01); *C08K 5/005* (2013.01)

(58) Field of Classification Search
None
See application file for complete search history.

(56) References Cited

FOREIGN PATENT DOCUMENTS

CN           106183268      * 12/2016

OTHER PUBLICATIONS

English translation of CN 106183268 (Year: 2016).*

* cited by examiner

*Primary Examiner* — Samir Shah

(57) ABSTRACT

A polymer pre-laid waterproof rolling material, including a polymer base material layer, a pressure-sensitive adhesive layer on the polymer base material layer, and a sand anti-sticking layer on the pressure-sensitive adhesive layer; the pressure-sensitive adhesive layer includes: 25-35 parts by mass of a styrene-isoprene-styrene block copolymer; 32-38 parts by mass of a C5 petroleum resin; 5-12 parts by mass of a 145 pentaerythritol modified rosin resin; 25-32 parts by mass of a naphthenic oil; 0.3 parts by mass of an antioxidant; and 0.5 parts by mass of a UV light stabilizer; the C5 petroleum resin has a softening point of 95-105° C. and a color number of less than 4; the naphthenic oil has a kinematic viscosity of 9-11 mm$^2$ at 100° C. and a density of 0.8950 g/cm$^3$-0.9100 g/cm$^3$ at 20° C. The pressure-sensitive adhesive layer has a stronger bonding effect with sintered sand and further improves the bonding effect with concrete.

7 Claims, 1 Drawing Sheet

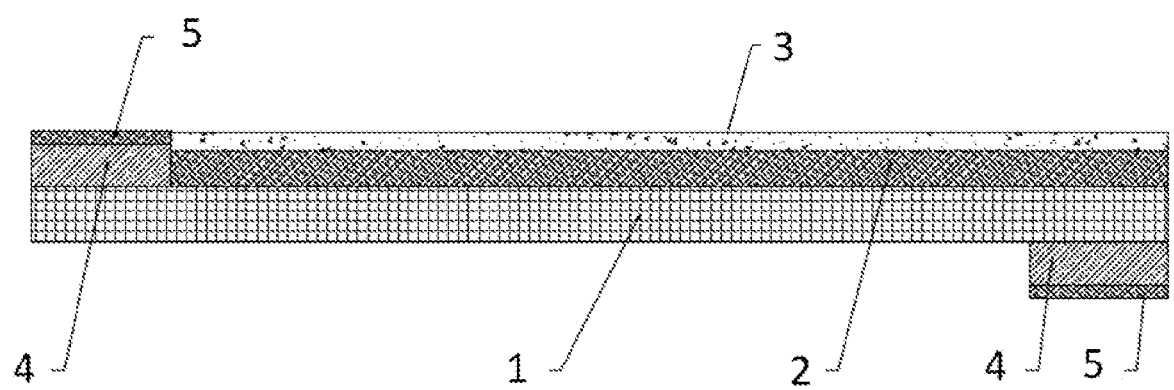

POLYMER PRE-LAID WATERPROOF ROLLING MATERIAL

TECHNICAL FIELD

The present invention relates to the field of waterproof, in particular to a polymer pre-laid waterproof rolling material.

BACKGROUND ART

A waterproof rolling material is mainly used for building walls and roofs, tunnels, highways, garbage landfills, etc., and is a flexible building material product that can be wound into a roll to resist external rainwater and groundwater leakage; as the foundation of the project, it is the first barrier for waterproofing of the whole project and has a vital faction in the whole project.

The existing pre-laid waterproof rolling materials generally include a substrate layer, an adhesive layer on the substrate layer, and a sand anti-sticking layer on the adhesive layer, however, there is a problem that the bonding of the adhesive layer and the sand anti-sticking layer is not strong enough, which is on one hand, due to the poor adhesion of the sand particles, and on the other hand, the viscosity of the adhesive layer cannot meet the requirements; the problem will cause unsatisfactory bonding effects between the rolling material and concrete during the construction, and the anti-sticking particles will easily shed off during the rolling up, which will affect the construction progress.

SUMMARY OF THE INVENTION

An object of the present invention is to provide a polymer pre-laid waterproof rolling material to solve the above-mentioned problems in the prior art.

In order to achieve the above object of the present invention, the following technical solutions are used:

a polymer pre-laid waterproof rolling material, comprising a polymer base material layer, a pressure-sensitive adhesive layer on the polymer base material layer, and a sand anti-sticking layer on the pressure-sensitive adhesive layer;

wherein the pressure-sensitive adhesive layer includes the following components:

25-35 parts by mass of a styrene-isoprene-styrene block copolymer;
32-38 parts by mass of a C5 petroleum resin;
5-12 parts by mass of a 145 pentaerythritol modified rosin resin;
25-32 parts by mass of a naphthenic oil;
0.3 parts by mass of an antioxidant; and
0.5 parts by mass of a UV light stabilizer;

the C5 petroleum resin has a softening point of 95-105° C. and a color number of less than 4; the naphthenic oil has a kinematic viscosity of 9-11 $mm^2$ at 100° C. and a density of 0.8950 $g/cm^3$-0.9100 $g/cm^3$ at 20° C.

Further, the melting index of the styrene-isoprene-styrene block copolymer is 10-15 g/10 min at 200° C., and the styrene-isoprene-styrene block copolymer contains 15-16 parts by mass of styrene, and has a diblock content of 50-60 parts by mass.

Further, the production process of the pressure-sensitive adhesive layer includes:

step i: adding the naphthenic oil, setting the heat transfer oil in the heating equipment to 180° C., the material temperature to 180° C., and the stirring frequency to 10 Hz;

step ii: when the material temperature is increased to 120° C., adding the C5 petroleum resin and the 145 pentaerythritol modified rosin resin, wherein the stirring frequency is 25 Hz;

step iii, adding a rubber when the material temperature is increased to 145° C.-150° C., wherein the stirring frequency is 40 Hz; and step iv: starting vacuumizing same when the material temperature is increased to 160° C., and discharging same when the material temperature rises to 180±5° C.

Further, the pressure-sensitive adhesive layer has a thickness of 0.25 mm-0.6 mm, more preferably 0.3 mm-0.4 mm, most preferably 0.35 mm.

Further, the sand anti-sticking layer is selected from a modified mullite.

Further, the modified mullite sand has been subjected to a surface treatment, the particle diameter is 0.3-0.5 mm, and the color of the sand particles is light yellow.

Further, when the sand anti-sticking layer is laminated with the pressure-sensitive adhesive layer, the surface temperature of the pressure-sensitive adhesive layer is 70° C., and the pressure of the pressure roller is ≥0.3 MPa.

Further, the material also comprises a lapping layer and a release film layer on the lapping layer, wherein there are two pairs of the lapping layer and release film layer, which are respectively positioned at the two ends of the polymer substrate layer and are respectively positioned on the upper surface and the lower surface thereof.

Further, the lapping layer comprises the following components:

32-38 parts by mass of a styrene-isoprene-styrene block copolymer;
38-47 parts by mass of a hydrogenated C5 resin;
1-8 parts by mass of a terpene phenol resin;
15-20 parts by mass of polyisobutylene;
0.3 parts by mass of an antioxidant; and
0.5 parts by mass of a UV light stabilizer;

the hydrogenated C5 resin has a softening point of 95-105° C. and a color number of 0, the terpene phenol resin has a softening point of 115° C., and the average molecular weight of the polyisobutylene is 1000.

Further, the lapping layer comprises the same components as that of the pressure-sensitive adhesive layer.

According to the technical solutions Mated above, the present invention has the following beneficial effects:

according to the application, a suitable pressure-sensitive adhesive component ratio is screened through a comparative experiment so as to improve the adhesive strength with the modified mullite, and prevent sand particles from shedding off in the transportation or construction process such that the pressure-sensitive adhesive layer is exposed to the outside; on one hand, this exposure causes the staff to stick to the sole when walking on the rolling material, which affects the flexibility in construction, and on the other hand, it intensifies the adhesion between the front and back surfaces when rolling up, which affects the difficulty in spreading; the peeling strength of the rolling material and concrete will also increase with the increase of the adhesion of the pressure sensitive adhesive layer.

The overlapping edge of the rolling material of the present application can be made of different components from the pressure sensitive adhesive layer to improve the mutual connection strength during the rolling material construction; in the rolling material production process, the overlapping edge layer and the release film layer which has a protective function are made into the components of the rolling material, thus eliminating the need to shovel off the sand layer during the construction and additionally to past the overlapping adhesive tape, and the overlapping operation can be carried out by directly tearing off the release film, the lapping edge and the rolling material are made into an integrated structure, and dust pollution before lapping is also isolated, such that the purity of the lapping layer is ensured, and the stability during the lapping is further improved; and the lapping edge layer can ensure that the lapping strength is still high below 50° C. in summer, the heating step is omitted in winter construction, and the lapping strength is also high at minus 10° C.

BRIEF DESCRIPTION OF THE DRAWINGS

In order to illustrate the technical solutions in the particular embodiments of the present invention or in the prior art more clearly, the accompanying drawings to be used in the description of the particular embodiments or the prior art will be briefly introduced below; obviously, the accompanying drawings in the following description show some of the embodiments of the present invention, and those of ordinary skill in the art may still derive other drawings from these accompanying drawings without creative effort.

FIG. 1 is a schematic structural diagram of the waterproof rolling material provided in an embodiment of the present invention.

Reference numbers in the drawings: 1—Polymer substrate layer; 2—Pressure-sensitive adhesive layer; 3—Sand anti-sticking layer; 4—Lapping layer; 5—Release film layer.

DETAILED DESCRIPTION OF EMBODIMENTS

The technical solutions in the present invention will be described clearly and completely below with reference to the drawings; obviously, the described embodiments are some of, rather than all of, the embodiments of the present invention. Based on the embodiments of the present invention, all other embodiments obtained by those of ordinary skill in the art without involving any inventive effort fall within the scope of protection of the present invention.

The polymer pre-laid waterproof rolling material of the present application comprises a polymer base material layer 1, a pressure-sensitive adhesive layer 2 on the polymer base layer 1, and a sand release layer 3 on the adhesive layer, as shown in FIG. 1;

the pressure-sensitive adhesive layer 2 comprises the following components:

25-35 parts by mass of a styrene-isoprene-styrene block copolymer;
32-38 parts by mass of a C5 petroleum resin;
5-12 parts by mass of a 145 pentaerythritol modified rosin resin;
25-32 parts by mass of a naphthenic oil;
0.3 parts by mass of an antioxidant; and
0.5 parts by mass of a UV light stabilizer;

the C5 petroleum resin has a softening point of 95-105° C. and a color number of less than 4; the naphthenic oil has a kinematic viscosity of 9-11 mm² at 100° C. and a density of 0.8950 g/cm³-0.9100 g/cm³ at 20° C.

Specifically, the melting index of the styrene-isoprene-styrene block copolymer is 10-15 g/10 min at 200° C., and the styrene-isoprene-styrene block copolymer contains 15-16 parts by mass of styrene, and has a diblock content of 50-60 parts by mass.

Specifically, the production process of the pressure-sensitive adhesive layer 2 includes:

step i: adding the naphthenic oil, setting the heat transfer oil in the heating equipment to 180° C., the material temperature to 180° C., and the stirring frequency to 10 Hz;

step ii: when the material temperature is increased to 120° C., adding the C5 petroleum resin and the 145 pentaerythritol modified rosin resin, wherein the stirring frequency is 25 Hz;

step iii, adding a rubber when the material temperature is increased to 145° C.-150° C., wherein the stirring frequency is 40 Hz; and step iv: starting vacuumizing same when the material temperature is increased to 160° C., and discharging same when the material temperature rises to 180±5° C.

Specifically, the pressure-sensitive adhesive layer 2 has a thickness of 0.25 mm-0.6 mm, more preferably 0.3 mm 0.4 mm, most preferably 0.35 mm.

Specifically, the sand anti-sticking layer 3 is selected from a modified mullite.

Specifically, the modified mullite sand has been subjected to a surface treatment, the particle diameter is 0.3-0.5 mm, and the color of the sand is light yellow; it can reduce reflectance and prevent human eyes from being damaged during large-area construction.

Specifically, when the sand anti-sticking layer 3 is laminated with the pressure-sensitive adhesive layer 2, the surface temperature of the pressure-sensitive adhesive layer 2 is 70° C., and the pressure of the pressure roller is ≥0.3 MPa.

Specifically, the material also comprises a lapping layer 4 and a release film layer 5 on the lapping layer, wherein there are two pairs of the lapping layer 4 and release film layer 5, which are respectively positioned at the two ends of the polymer substrate layer 1 and are respectively positioned on the upper surface and the lower surface thereof; the release film layer 5 is made of materials such as the polyethylene release film and polyethylene terephthalate, and the thickness of the overlapping layer 4 is 0.3-0.5 mm.

Specifically, the lapping layer 4 comprises the following components:

32-38 parts by mass of a styrene-isoprene-styrene block copolymer;
38-47 parts by mass of a hydrogenated C5 resin;
1-8 parts by mass of a terpene phenol resin;
15-20 parts by mass of polyisobutylene;
0.3 parts by mass of an antioxidant; and
0.5 parts by mass of a UV light stabilizer;

the hydrogenated C5 resin has a softening point of 95-105° C. and a color number of 0, the terpene phenol resin has a softening point of 115° C., and the average molecular weight of the polyisobutylene is 1000.

Specifically, the lapping layer 4 contains the same components as that of the pressure-sensitive adhesive layer 2.

The present invention relates to a polymer pre-laid waterproof rolling material, wherein the polymer base material layer 1 mainly has a waterproof function and can be selected from one or a combination of more of polyethylene, polypropylene, an ethylene-olefin copolymer, an ethylene-vinyl acetate copolymer, polyvinyl acetate, polyethyl acrylate, polytetrafluoroethylene, polyvinylidene fluoride, polyethylene terephthalate, polyvinyl chloride and polyamide, preferably polyethylene, polypropylene and an ethylene-olefin copolymer, more preferably polyethylene, an ethylene-olefin copolymer, polyethylene terephthalate, and most preferably polyethylene; the pressure sensitive adhesive layer 2 serves to connect the base material layer and the sand layer, and to bond concrete during the construction, and can be selected from one or more of a butyl rubber-based adhesive, a polyisobutylene-based adhesive, a butyl adhesive, an acrylic adhesive and a styrene block copolymer adhesive.

The styrene-isoprene-styrene block copolymer contained in the lapping layer 4 has a melt index of 25-30 g/10 min at 200° C. and a specific composition of 14-15 parts by mass of styrene; The diblock content is 40-60 parts by mass.

The production method of the lapping layer 4 involves: step I: adding polyisobutene PIB, setting the temperature of the heat transfer oil to 180° C., the material temperature to 180° C., and the stirring frequency to 10 Hz; step II: when the material TEMP is increased to 120° C., adding a hydrogenated C5 resin and a terpene phenol resin, and set stirring frequency to 25 Hz; and step III: adding a styrene-isoprene-styrene block copolymer when the material temperature is increased to 145-150° C., wherein the stirring speed is 40 Hz; starting vacuumizing same when the material temperature is increased to 160° C., and discharging same when the material temperature is increased to 180±5° C.

Five groups of experiments are selected for comparison according to different proportions of the two components of the pressure-sensitive adhesive layer 2 to prove that the technical scheme as claimed by the present application has better technical effects:

Experiment 1

The specific formulation ratio is: a mass ratio of styrene-isoprene-styrene block copolymer:C5 petroleum resin:145 Pentaerythritol modified rosin resin:naphthenic oil:antioxidant:UV light stabilizer=26:34:10:30:0.3:0.5;

Experiment 2

The specific formulation ratio is: a mass ratio of styrene-isoprene-styrene block copolymer:C5 petroleum resin:145 Pentaerythritol modified rosin resin:naphthenic oil:antioxidant:UV light stabilizer=37:33:5:25:0.3:0.5;

Experiment 3

The specific formulation ratio is: a mass ratio of styrene-isoprene-styrene block copolymer:C5 petroleum resin:145 Pentaerythritol modified rosin resin:naphthenic oil:antioxidant:UV light stabilizer=25:42:8:25:0.3:0.5;

Experiment 4

The specific formulation ratio is: a mass ratio of styrene-isoprene-styrene block copolymer:C5 petroleum resin:145 Pentaerythritol modified rosin resin:naphthenic oil:antioxidant:UV light stabilizer=30:38:3:29:0.3:0.5;

Experiment 5

The specific formulation ratio is: a mass ratio of styrene-isoprene-styrene block copolymer:C5 petroleum resin:145 Pentaerythritol modified rosin resin:naphthenic oil:antioxidant:UV light stabilizer=25:32:8:35:0.3:05.

The experimental results are as shown in Table 1:

TABLE 1

Experimental results of pressure-sensitive adhesive components at different ratios

| Item | | Chinese standard | Experiment 1 | Experiment 2 | Experiment 3 | Experiment 4 | Experiment 5 |
|---|---|---|---|---|---|---|---|
| Heat resistance | | 80° C., 2 hours No flowing | Pass | Pass | Pass | Pass | Not accepted |
| Low temperature flexibility | | Adhesive layer −25° C., No crack | Pass | Pass | Pass | Pass | Pass |
| Low temperature flexibility after heat aging | | Adhesive layer −23° C., No crack | Pass | Pass | Not accepted | Pass | Pass |
| Peeling strength with post-casted concrete (N/mm) | No treatment | ≥1.5 | 2.88 | 1.48 | 2.36 | 1.32 | 1.22 |
| | Soaking treatment | ≥1.0 | 2.32 | 0.98 | 1.98 | 0.88 | 1.01 |
| | Sediment-contaminated surface | ≥1.0 | 2.76 | 1.56 | 2.35 | 1.02 | 1.18 |
| | Ultraviolet light treatment | ≥1.0 | 2.54 | 1.40 | 2.02 | 0.78 | 1.13 |
| | Heat treatment | ≥1.0 | 2.48 | 1.66 | 2.22 | 1.06 | 1.24 |
| Peeling strength with post-casted concrete after soaking (N/mm) | | ≥1.0 | 2.23 | 1.02 | 2.05 | 0.56 | 0.96 |
| Peeling strength with rolling material (lapping edge) (N/mm) | No treatment | ≥0.8 | 1.88 | 1.20 | 1.48 | 0.87 | 0.88 |
| | Soaking treatment | ≥0.8 | 1.56 | 1.05 | 1.32 | 0.79 | 0.86 |

It can be seen form Table 1 that

In Experiment 1, the ratios as claimed by the present application are selected, and all the performances meet the requirements;

In experiment 2, although the strength of the pressure-sensitive adhesive can be increased by increasing the amount of an SIS rubber, the sand embedding degree is deteriorated and the peeling force is deteriorated;

In Experiment 3, increasing the amount of petroleum resin causes the pressure sensitive adhesive to harden, which leads to not accepted low temperature performance after thermal aging;

In experiment 4, the amount of the rosin resin is reduced, resulting in poor initial adhesion of the pressure sensitive adhesive, poor adhesion of the sand and the gum layer, and a decreased peeling force; and In experiment 5, the amount of the plasticizer naphthenic oil is increased such that the cohesive force of the pressure sensitive adhesive is decreased, which leads to the pressure-sensitive adhesive failing to meet the requirements of a high temperature.

Five groups of experiments are selected for comparison according to different ratios of the four components of the lapping layer 4 to prove that the technical solution as claimed by the application has better technical effects:

Experiment 6

The specific formulation ratio is: a mass ratio of styrene-isoprene-styrene block copolymer:hydrogenated C5 resin: terpene phenol resin:polyisobutylene PIB:antioxidant:UV light stabilizer=37:42:3:18:0.3:0.5;

Experiment 7

The specific formulation ratio is: a mass ratio of styrene-isoprene-styrene block copolymer:hydrogenated C5 resin: terpene phenol resin:polyisobutylene PIB:antioxidant:UV light stabilizer=30:45:7:18:0.3:0.5;

Experiment 8

The specific formulation ratio is: a mass ratio of styrene-isoprene-styrene block copolymer:hydrogenated C5 resin: terpene phenol resin:polyisobutylene PIB:antioxidant:UV light stabilizer=32:49:6:15:0.3:0.5;

Experiment 9

The specific formulation ratio is: a mass ratio of styrene-isoprene-styrene block copolymer:hydrogenated C5 resin: terpene phenol resin:polyisobutylene PIB:antioxidant:UV light stabilizer=37:38:10:15:0.3:0.5;

Experiment 10

The specific formulation ratio is: a mass ratio of styrene-isoprene-styrene block copolymer:hydrogenated C5 resin: terpene phenol resin:polyisobutylene PIB antioxidant:UV light stabilizer=32:42:4:22:0.3:05.

The high-temperature persistent adhesivity experiment of different components above the lapping layer 4 is carried out in an oven at 50° C. The lapping layer 4 is cut into a width of 5 cm, the lapping length is 7.5 cm, and the weight at the bottom of the sample is 1 kg after lapping. The results of the high-temperature persistent adhesivity experiment are as shown in Table 2:

| Item | Experiment 6 | Experiment 7 | Experiment 8 | Experiment 9 | Experiment 10 |
| --- | --- | --- | --- | --- | --- |
| High temperature persistent adhesivity at 50° C. | Day 20 | Day 3 | Day 5 | Day 10 | Day 2 |
| Phenomenon | Good adhesion | Lapping opening | Lapping breaking | Lapping opening | Lapping slipping |

Table 2 Experimental Results of Different Ratios of Lapping Layer Components

It can be seen from Table 2 that

Experiment 6: experiment 6 shows the best lapping performance;

Experiment 7: the amount of the styrene-isoprene-styrene block copolymer is decreased such that the adhesive strength of the lapping layer 4 is decreased, and the lapping opening occurs after a period of time;

Experiment 8: the amount of the hydrogenated C5 resin is increased such that the lapping layer 4 get hardened, and under the conditions of a high temperature, an opening appears at the lapping part and then slow breaking occurs;

Experiment 9: the amount of the terpene phenol resin is increased, and after a long period of time, the lapping layer 4 is aged and cracks appears at the lapping edge with shedding; and Experiment 10: the amount of the polyisobutylene PIB becomes larger such that the cohesive force of the lapping layer 4 is decreased, and the adhesive layer slips off and separates apart with respect to the high-temperature persistent adhesivity.

It should be finally noted that, the above embodiments are merely used for illustrating, rather than limiting, the technical solution of the present invention; although the present invention has been described in detail with reference to the foregoing embodiments, it should be understood by those of ordinary skill in the field; the technical solutions specified in the foregoing embodiments could still be modified, or some or all of the technical features thereof may be equivalently replaced; and the modifications or replacements do not make the essence of corresponding technical solutions depart from the scope of the technical solution of the embodiments of the present invention.

The invention claimed is:

1. A polymer pre-laid waterproof rolling material, wherein the polymer pre-laid waterproof rolling material comprising a polymer base material layer, a pressure-sensitive adhesive layer on the polymer base material layer, a sand anti-sticking layer on the pressure-sensitive adhesive layer, a lapping layer and a release film layer on the lapping layer, wherein there are two pairs of the lapping layer and release film layer, which are respectively positioned at the two ends of the polymer base material layer and are respectively positioned on the upper surface and the lower surface thereof;

wherein the pressure-sensitive adhesive layer includes the following components:
25-35 parts by mass of a styrene-isoprene-styrene block copolymer;
32-38 parts by mass of a C5 petroleum resin;
5-12 parts by mass of a 145 pentaerythritol modified rosin resin;
25-32 parts by mass of a naphthenic oil;
0.3 parts by mass of an antioxidant; and
0.5 parts by mass of a UV light stabilizer;
the C5 petroleum resin has a softening point of 95-105° C. and a color number of less than 4; the naphthenic oil has a kinematic viscosity of 9-11 mm$^2$ at 100° C. and a density of 0.8950 g/cm$^3$-0.9100 g/cm$^3$ at 20° C.;
wherein the lapping layer comprises the following components:
32-38 parts by mass of a styrene-isoprene-styrene block copolymer;
38-47 parts by mass of a hydrogenated C5 resin;
1-8 parts by mass of a terpene phenol resin;
15-20 parts by mass of polyisobutylene;
0.3 parts by mass of an antioxidant; and
0.5 parts by mass of a UV light stabilizer;
the hydrogenated C5 resin has a softening point of 95-105° C. and a color number of 0, the terpene phenol resin has a softening point of 115° C., and the average molecular weight of the polyisobutylene is 1000.

2. The polymer pre-laid waterproof rolling material according to claim 1, wherein the melting index of the styrene-isoprene-styrene block copolymer of the pressure-sensitive adhesive layer is 10-15 g/10 min at 200° C., and the styrene-isoprene-styrene block copolymer of the pressure-sensitive adhesive layer contains 15-16 parts by mass of styrene, and has a diblock content of 50-60 parts by mass.

3. The polymer pre-laid waterproof rolling material according to claim 1, wherein the production process of the pressure-sensitive adhesive layer includes:
   step i: adding the naphthenic oil, setting the heat transfer oil in the heating equipment to 180° C., the material temperature to 180° C., and the stirring frequency to 10 Hz;
   step ii: when the material temperature is increased to 120° C., adding the C5 petroleum resin and the 145 pentaerythritol modified rosin resin, wherein the stirring frequency is 25 Hz;
   step iii, adding a rubber when the material temperature is increased to 145° C.-150° C., wherein the stirring frequency is 40 Hz; and
   step iv: starting vacuumizing the same when the material temperature is increased to 160° C., and discharging the same when the material temperature rises to 180±5° C.

4. The polymer pre-laid waterproof rolling material according to claim 1, wherein the pressure-sensitive adhesive layer has a thickness of 0.25 mm-0.6 mm.

5. The polymer pre-laid waterproof rolling material according to claim 1, wherein the sand anti-sticking layer is selected from a modified mullite.

6. The polymer pre-laid waterproof rolling material according to claim 5, wherein the modified mullite sand has been subjected to a surface treatment, the particle diameter is 0.3-0.5 mm, and the color of the sand particles is light yellow.

7. The polymer pre-laid waterproof rolling material according to claim 1, wherein when the sand anti-sticking layer is laminated with the pressure-sensitive adhesive layer, the surface temperature of the pressure-sensitive adhesive layer is 70° C., and the pressure of the pressure roller is ≥0.3 MPa.

* * * * *